Sept. 15, 1970     R. L. GARRETT     3,528,217
SUPERSONIC FLOW SEPARATOR WITH FILM FLOW COLLECTOR
Filed May 20, 1968
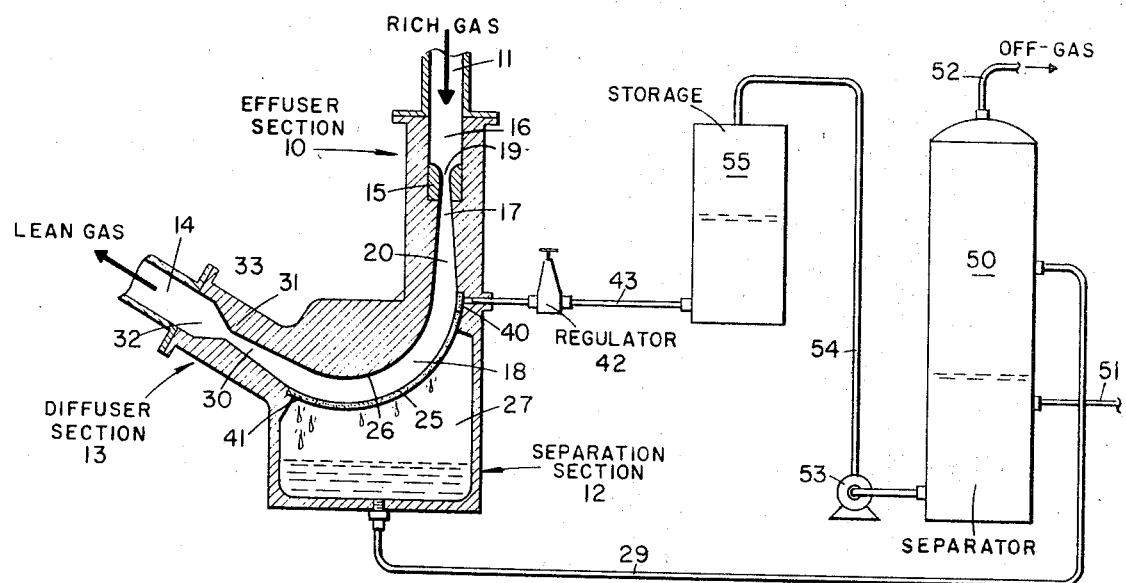
FIG. 1.
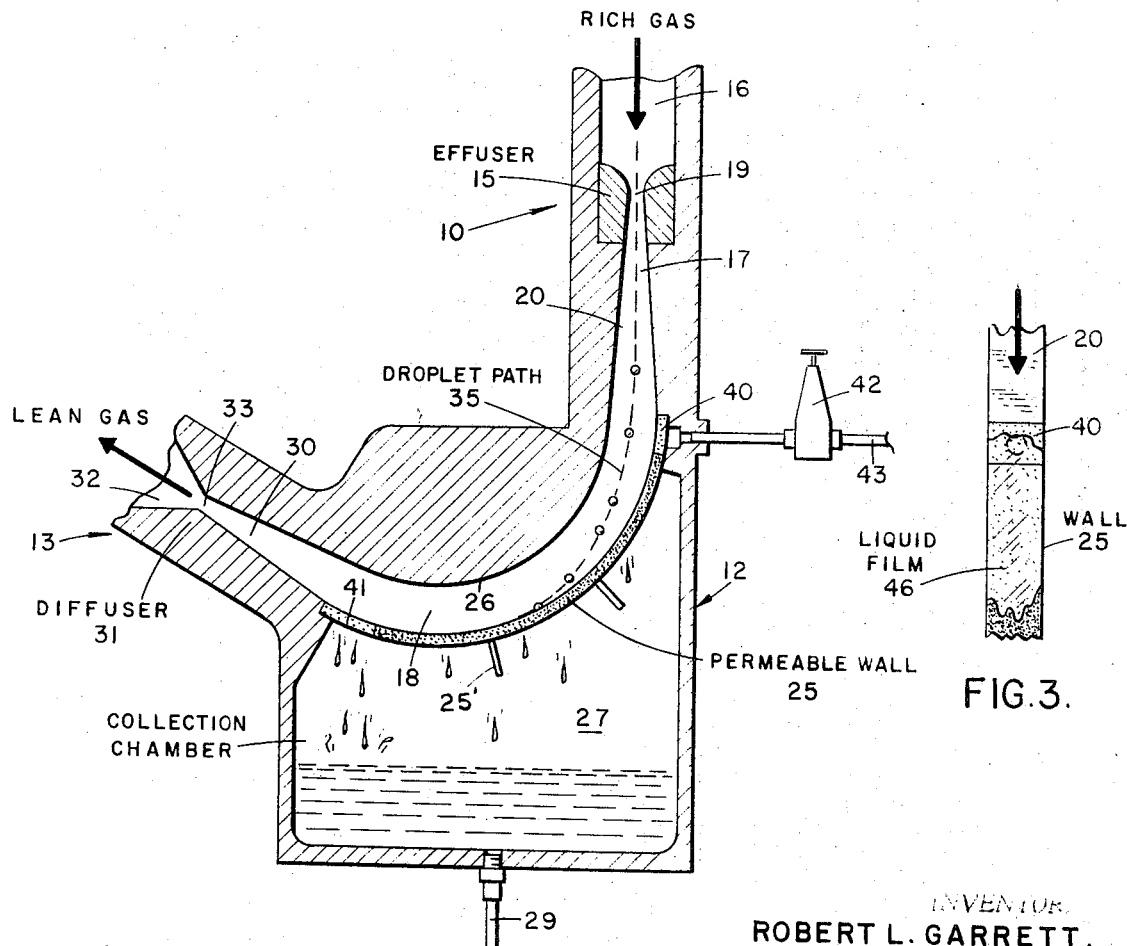
FIG. 2.
FIG. 3.
INVENTOR.
ROBERT L. GARRETT,
BY John L. Schneider
ATTORNEY.

United States Patent Office 3,528,217
Patented Sept. 15, 1970

3,528,217
SUPERSONIC FLOW SEPARATOR WITH FILM FLOW COLLECTOR
Robert L. Garrett, Houston, Tex., assignor to Esso Production Research Company, a corporation of Delaware
Filed May 20, 1968, Ser. No. 730,373
Int. Cl. B01d 51/08
U.S. Cl. 55—15                                13 Claims

ABSTRACT OF THE DISCLOSURE

Method and apparatus for separating one or more components from a multicomponent, high-pressure gas stream. The gas stream is expanded to supersonic velocities through a supersonic effuser to achieve low temperatures and low pressures in the supersonic gas stream and cause condensed particles or droplets to form. The supersonic gas stream is made to traverse a planar bend provided with a permeable outer wall to and through which the condensed particles are inertially moved and thereby separated from the gas stream. The separated condensed particles are collected along with dissolved and entrained gases or vapors which also separate from the gas stream. The supersonic gas stream is then decelerated to subsonic flow through a diffuser and part of the pressure of the gas stream is recovered. A flowing liquid film is formed on the permeable outer wall to collect condensate droplets inertially moved to the outer wall by centrifugation. Additionally, the liquid film fills the pores, keeping a high liquid saturation and prevents the vapors from passing through the permeable wall, serving to make a more efficient separation of phases possible than would occur without the added liquid.

---

The present invention generally concerns supersonic separation of condensable components of a multicomponent, high-pressure gas stream. More particularly, the present invention concerns method and apparatus in which high efficiency expansion of a gas stream to supersonic velocities cools the gas stream to form a condensed phase or phases. The condensed phases may be solid and/or liquid (droplets) particles, which are inertially moved to and through a permeable wall as the gas stream traverses a planar bend. A diffuser located at the end of the bend compresses and decelerates the gas stream to low subsonic velocities. Gases either entrained or dissolved in the other phases also are separated from the gas stream along with the condensed phase. Although a high efficiency expansion occurs in this type supersonic separator to cause primarily liquid phase to form in the expanded gas stream, such liquid ejected to the outer curvature of the wall bend by inertial force, as the gas stream bearing the liquid is abruptly turned around the bend, impacts the permeable wall with force (mainly as small liquid droplets). Some of the liquid bounces off the permeable wall and is lost back into the gas stream. The present invention is specifically directed to overcoming this "loss" problem by capturing and trapping the liquid droplets which contact the permeable wall with a liquid film. In addition to catching the liquid droplets which impact on the permeable wall bend, the technique of the present invention offers the additional advantage of removing the semisolids and solids including hydrates, ice crystals, paraffin, carbon dioxide, hydrogen sulfide and other problem materials which could plug the permeable wall, or would be preferably removed from the gas.

Briefly, then, the present invention involves a method for separating condensable components from a multicomponent gas stream which includes the steps of expanding the gas stream through a supersonic effuser to achieve low temperatures and low pressures in the supersonic gas stream and to form thereby condensed phase particles and droplets; separating the particles from the gas stream by directing the gas stream to traverse a planar bend provided with a permeable wall to and through which particles are inertially moved; decelerating the gas stream to subsonic flow through a supersonic diffuser and recovering a portion of the pressure of the gas stream; and introducing a liquid film along the permeable wall to collect the particles for passage through the permeable wall. The film liquid is preferably a nonvolatile liquid, partially or totally miscible with or a solvent for the particles separated from the gas stream. When the gas stream is a natural gas stream and the condensed liquid phase includes mostly lower molecular weight hydrocarbons, such as ethane, propane, butane, pentane, etc., the film liquid may be a heavy hydrocarbon or a material such as a three carbon or higher alcohol which forms a microemulsion with the particles. The film liquid carried through the permeable wall with the condensate liquid may be recycled into the gas stream after separation from the condensate. The invention also includes apparatus for carrying out the method described supra.

The following terms used herein are defined in accordance with general aerodynamic usage:

"Supersonic effuser" means a flow channel having a convergent subsonic section upstream of a divergent supersonic section with an intervening sonic throat which functions as an aerodynamic expander.

"Supersonic diffuser" means a flow channel having a convergent supersonic section upstream of a divergent subsonic section with an intervening sonic throat which functions as an aerodynamic compressor.

"Shock wave" means any discontinuity in supersonic flow across which flow properties abruptly change.

"Normal (90°) sock wave" is a shock wave across which gas stream velocity changes from supersonic to subsonic flow—as in a diffuser.

"Final shock wave" is a normal shock wave which occurs at or near the throat of a supersonic diffuser.

"Throat" means a reduced area in a flow channel, as in an effuser or diffuser.

"Contour" means shape of the wall or walls of the flow channel, as in an effuser, diffuser or separator bend.

"Gaseous or gas stream" means a stream completely in the gas phase or one containing liquids and/or solids.

A primary object of the present invention is therefore to provide improved method and apparatus for separating condensable components from a gaseous flow stream.

The above object and other objects and advantages of the present invention will be apparent from the following description when taken with the drawings wherein:

FIG. 1 is a side view of the supersonic expander-separator of the invention together with a schematic diagram of a recycle system;

FIG. 2 is an enlarged view of the supersonic expander-separator apparatus shown in FIG. 1; and FIG. 3 is an enlarged view of the permeable wall portion of the supersonic expander-separator apparatus.

Referring to FIGS. 1 and 2, the components of the supersonic expansion separator illustrated are an effuser section 10 connected at its subsonic end to a source of high-pressure gas in inlet conduit 11 and at its supersonic end to a separation section 12. The supersonic end of a diffuser section 13 is connected to the downstream end of separation section 12. The subsonic end of diffuser section 13 is connected to a gas stream discharge conduit 14.

Effuser section 10 includes a replaceable effuser 15 having a convergent subsonic section 16, connected to inlet conduit 11, and a divergent supersonic section 17 connected to a flow channel 18 of separation section 12.

The effuser has an intervening sonic throat 19. The function of the effuser is to expand gas flowing therethrough essentially isentropic. The design of effusers of this type is well known to the art and may be according to principles described in DRL Publication No. 406 of the Defense Research Laboratories, University of Texas (1957), or the pamphlet by Kuno Foelsch, No. NA–46–235–2, published by North American Aircraft Corporation, May, 1946. Other references which describe effuser design methods for rectangular cross section configurations are, "An Accurate and Rapid Method for the Design of Supersonic Nozzles," Beckworth, J. E., and Moore, J. A., NACA Space TN 3322, February, 1955; "Nozzles for Supersonic Flow Without Shock Fronts," Shapiro, A. H., Journal of Applied Mechanics, Transactions ASME, vol. 66, p. A–93 (1944); "Supersonic Wind Tunnels—Theory, Design and Performance," J. Ruptash, UTIA Review No. 5, U. of Toronto, I vol. of Aerophysics, June, 1952; and 'Nozzle Design," Puckett, A. E., Journal of Applied Mechanics, December, 1946, p. 265. A reference describing diffuser design methods for circular cross section configurations is, "The Analytical Design of an Axially Symmetric Laval Nozzle for a Parallel and Uniform Jet," Foelsch, J., Journal of Aeronautical Sciences, March, 1949, p. 161 ff.

In gas streams expanded by such supersonic effusers, the temperature achieved can be low, dependent upon the amount of condensation occurring. Such temperatures can be predicted for simple flow systems using information given in The Dynamics and Thermodynamics of Compressible Fluid Flow, vols. 1 and 2, by Ascher H. Shapiro, The Ronald Press Company, New York.

The supersonic section 17 of effuser 15 includes a generally divergent straight flow path 20 of rectangular cross section. This intermediate section is used to provide time for natural forces in supersonic flow to cause droplet coalescence in certain applications of the supersonic expanders; however, it is not a necessary feature in all applications thereof. Flow path or channel 20 is made divergent in order to maintain the gas stream at high velocity. The design of divergent channels of this type may be found in a number of publications, The Journal of Applied Physics, June, 1946, an article by J. H. Keenan and E. P. Newmann entitled, "Measurement of Friction in a Pipe for Subsonic and Supersonic Flow of Air," presents experimental data to substantiate theory on friction losses. An article by R. E. Wilson entitled, "Turbulent Boundary Layer Characteristics at Supersonic Speeds—Theory and Experiment," Journal of Aeronautical Sciences, vol. 17, p. 585, presents a complete description of channel compensation.

Flow path or channel 18 is curved and is preferably of rectangular cross section. It is formed of opposing side walls, an outer curved permeable wall 25 and an inner coplanar curved wall 26. Permeable wall 25 may be formed of permeable metal, such as granules or wires sintered together to provide strength and permeability. Channel 18 is curved in design in accordance with principles set forth in an article by L. Liccini entitled, "Analytical and Experimental Investigation of 90° Supersonic Turbine Passages Suitable for Supersonic Compressors and Turbines," National Advisory Committee for Aeronautics, RLM 9G07 (1949), or as in an article by E. Boxer et al. entitled, "Application of Supersonic Vortex Flow Theory to the Design of Supersonic Impulse Compressors or Turbine Blade Sections," National Advisory Committee for Aeronautics, RLM 52B06 (1952). Channel 18 is also diverged in accordance with the equations and tables in the aforementioned article by R. E. Wilson. General information on this article, including circularly and rectangularly configured channels may be found in texts, such as vols. 1 and 2 of the aforementioned Shapiro reference and for rectangular configurations alone, the aforementioned bulletin by J. Ruptash.

Permeable wall 25 is held in place by means of wall supports 25' shown in FIG. 2. Condensed particles which separate from the gas stream and pass through permeable wall 25 flow into a collection chamber 27.

Conduit 29 is connected to chamber 27 for the purpose of discharging gas and liquid collected in chamber 27. The downstream end of channel 18 at the end of the bend or curve connects to a convergent supersonic section 30 of diffuser 31 which also includes a divergent subsonic section 32 which connects to discharge conduit 14 and has an intervening throat 33. The contour of diffuser 31 and the area of throat 33 are preferably made adjustable.

A liquid inlet 40 is provided at the upstream end of permeable wall 25 and a liquid discharge outlet 41 is provided at the downstream end of permeable wall 25. Inlet 40 and outlet 41 consist of more permeable areas than the other portions of wall 25. A suitable liquid film feed regulator 42 is arranged in inlet conduit 43 which is connected to inlet 40.

In operation, a high-pressure, multicomponent (rich) gas containing condensable components, such as rich natural gas, is conducted through inlet conduit 11 into effuser 15. Expansion cooling occurs in effuser 15 as the gas stream attains supersonic velocity downstream of throat 19 in the divergent supersonic section 17 including divergent channel 20. Condensable components of the gas stream are condensed as liquid droplets. These droplets are inertially moved toward the outer curve (wall 25) of the bend in channel 18 as indicated by droplet path 35. Such liquid impacts wall 25 with force. A liquid film 46 is introduced at the upstream end of the bend through regulator 42, conduit 43, and inlet 40 to provide a slow moving liquid film along the surface of wall 25 as illustrated more clearly in FIG. 3. The film is carried along by the gas stream velocity adjacent wall 25 to catch and trap the condensed particles. Flowing film 46 entraps the liquid condensate and moves to the end of the bend where it is removed from channel 18 through discharge outlet 41 whch may be provided with a highly permeable opening. The film liquid is preferably a nonvolatile liquid, miscible with the condensed liquid. Thus, when the gas stream is a natural gas stream, the film liquid may be a hydrocarbon fraction or one having hydocarbon material characteristics so that the condensate has a high affinity for the film liquid. However, the film liquid may be a material or mixture of materials which can either dissolve or emulsify liquid, solids or semisolids or diverse character, as, for example, an alcohol containing a detergent to dissolve the cold liquid hydrocarbon, hydrates, ice and paraffin solids when the gas stream is a natural gas stream. The film liquid also has sufficiently high viscosity and pituitous characteristics that it does not disintegrate in the flowing and trapping process. Suitable film liquids for use with a natural gas stream are, for example, propyl, butyl, and amyl alcohols, $C_4$–$C_5$ glycols, with or without a viscosity builder, as for example, a polymer polyvinylpyrrolidone, or polyvinyl acetate or hydroxy butoxyl methyl cellulose. In some cases, emulsion formation may be more desirable than miscibility because of the higher flow resistance and better sealing ability of emulsion particles passing through permeable walls. The film liquid may contain a detergent, hydrotropic agent or surfactant. Viscous long chain hydrocarbons might also be used as the film liquid. The viscosity of the film liquid is selected relative to the permeability of wall 25 so as to maintain a good liquid seal. That is, the more viscous film liquids are used with higher permeability walls, as in the case where solids are present in the stream.

The remaining supersonic gas stream stripped of its condensable components is decelerated to near zero velocity by diffuser 31 and the pressure of the lean stripped gas approaches that of the rich inlet gas.

If desired, a rejuvenating process may be used to free the condensate from the film liquid which is thereafter recycled. That process is illustrated in FIG. 1 where discharge conduit 29 is connected to a separator tank 50. Condensed hydrocarbons are removed through conduit 51, gases are removed through conduit 52, and the film liquid is pumped by means of pump 53 through conduit 54 to a storage container 55, whence it flows to regulator 42 and returns to the surface of wall 25.

General diffuser design information concerning contours, throat areas, lengths and other parameters thereof can be found in the text, Supersonic Inlet and Introduction to Internal Aerodynamics, by Dr. Rudolf Hermann, published by Minneapolis-Honeywell Regulator Company, Minneapolis, Minnesota, and Minneapolis-Honeywell Regultor Company, Ltd., Toronto, Canada, second edition. The diffuser can be made adjustable in its contour and throat area in order to obtain weak shock waves properly located within the convergent portion of the diffuser and a normal (final) shock wave at or near the diffuser throat. The reason for so locating these waves is to achieve maximum pressure recovery by decelerating supersonic flow.

The preferred embodiment of the invention as specifically illustrated and described herein may be modified without departing from the spirit and scope of the invention as defined in the appended claims.

Other supersonic separator apparatus and techniques may be utilized with the concepts disclosed herein such as those illustrated and described in the following co-pending United States patent applications: Ser. No. 730,372, entitled, "Jet Pump and Supersonic Flow Separator," by Robert L. Garrett, filed May 20, 1968; Ser. No. 730,375, entitled, "Triangular Supersonic Flow Separator," by Robert L. Garrett and William J. McDonald, Jr., filed May 20, 1968; Ser. No. 730,371, entitled, "Supersonic Flow Separator," by Robert L. Garrett, filed May 20, 1968; and Ser. No. 730,374, entitled, "Supersonic Flow Separator with Admixing," by Robert L. Garrett and William J. McDonald, Jr., filed May 20, 1968.

Having fully described the method, apparatus, advantages and operation of my invention, I claim:

1. A method for condensing and separating components from a multicomponent gas stream comprising:
   expanding said gas stream through a supersonic effuser to achieve low temperatures and low pressures in the supersonic gas stream and thereby form condensed particles;
   moving said particles to an outer boundary of said gas stream;
   flowing a liquid film along said outer boundary to collect said condensate particles moved to said outer boundary;
   separating said liquid film and said particles collected by said liquid film from said gas stream at said outer boundary; and
   decelerating said gas stream to subsonic flow through a diffuser and recovering thereby a portion of the pressure of said gas stream.

2. A method as recited in claim 1 in which said film liquid comprises a material miscible with said particles.

3. A method as recited in claim 1 in which said film liquid comprises a nonvolatile liquid for said particles.

4. A method as recited in claim 1 in which said film liquid comprises a material adapted to form a microemulsion with said particles.

5. A method as recited in claim 1 including separating said film liquid from said particles after separation of said particles and film liquid from said gas stream and then recycling said film liquid so separated to said outer boundary.

6. A method as recited in claim 1 in which said gas stream is a natural gas stream.

7. A method as recited in claim 6 in which said film liquid comprises an alcohol containing a detergent.

8. A method as recited in claim 7 in which said alcohol comprises butyl alcohol.

9. A method as recited in claim 6 in which said film liquid comprises a viscous hydrocarbon.

10. A method as recited in claim 6 in which said film liquid includes a viscosity builder.

11. A method as recited in claim 10 in which said viscosity builder comprises a polymer, polyvinylpyrrolidone.

12. Apparatus for condensing and separating components from a multicomponent gas stream comprising:
    a supersonic effuser capable of expanding said gas stream to achieve low temperatures and low pressure in said supersonic gas stream and to form thereby condensed particles;
    separation means through which said gas stream is adapted to be passed for separating said condensed particles from said gas stream;
    said separation means including a curved flow path having an outer curved permeable wall;
    another permeable wall arranged at the upstream end of said curved permeable wall adapted to introduce a liquid film to said curved permeable wall to collect said particles for passage through said curved permeable wall;
    means arranged at the downstream end of said curved permeable wall adapted to discharge said liquid film and said collected particles from said gas stream, including an outer wall area more permeable than the remainder of said curved wall;
    means adapted to separate said film liquid and particles discharged from said gas stream from each other;
    means adapted to recycle said liquid film from said particles to the upstream end of said curved permeable wall for introduction to said curved permeable wall; and
    a diffuser capable of decelerating said gas stream to subsonic flow to recover a portion of said gas stream.

13. Apparatus for condensing and separating components from a multicomponent gas stream comprising:
    a supersonic effuser capable of expanding said gas stream to achieve low temperatures and low pressure in said supersonic gas stream and to form thereby condensed particles;
    separation means through which said gas stream is adapted to be passed for separating said condensed particles from said gas stream;
    said separation means including a curved flow path having an outer curved permeable wall;
    another permeable wall arranged at the upstream end of said curved permeable wall adapted to introduce a liquid film to said curved permeable wall to collect said particles for passage through said curved permeable wall;
    means arranged at the downstream end of said curved permeable wall adapted to discharge said liquid film and said collected particles from said gas stream, including an outer wall area more permeable than the remainder of said curved wall; and
    a diffuser capable of decelerating said gas stream to subsonic flow to recover a portion of said gas stream.

References Cited

UNITED STATES PATENTS

| | | | |
|---|---|---|---|
| 1,519,428 | 12/1924 | Wilisch | 55—461 |
| 3,353,335 | 11/1967 | Caballero | 55—94 |
| 3,403,498 | 10/1968 | Pasha | 55—90 |

OTHER REFERENCES

Cornvich, et al.: "Handbook of Supersonic Aerodynamics," section 17, NAVWEDS Report 1488 (vol. 6), January 1964, pp. 237–240 and 273–275.

REUBEN FRIEDMAN, Primary Examiner

C. N. HART, Assistant Examiner

U.S. Cl. X.R.

55—277, 461, 421